United States Patent
Valpey, III et al.

(10) Patent No.: US 7,196,043 B2
(45) Date of Patent: Mar. 27, 2007

(54) PROCESS AND COMPOSITION FOR PRODUCING SELF-CLEANING SURFACES FROM AQUEOUS SYSTEMS

(75) Inventors: Richard S. Valpey, III, Lindenhurst, IL (US); Matthew A. Jones, Racine, WI (US)

(73) Assignee: S. C. Johnson & Son, Inc., Racine, WI (US)

(*) Notice: Subject to any disclaimer, the term of this patent is extended or adjusted under 35 U.S.C. 154(b) by 434 days.

(21) Appl. No.: 10/691,046

(22) Filed: Oct. 22, 2003

(65) Prior Publication Data

US 2004/0127393 A1 Jul. 1, 2004

Related U.S. Application Data

(60) Provisional application No. 60/420,711, filed on Oct. 23, 2002.

(51) Int. Cl.
- C11D 3/02 (2006.01)
- C11D 3/24 (2006.01)
- C11D 3/37 (2006.01)
- C11D 7/28 (2006.01)
- C11D 9/06 (2006.01)

(52) U.S. Cl. ............... 510/204; 510/193; 510/206; 510/348; 510/475

(58) Field of Classification Search ........ 510/193, 510/204, 206, 348, 475
See application file for complete search history.

(56) References Cited

U.S. PATENT DOCUMENTS

| | | | |
|---|---|---|---|
| 3,354,022 A | 11/1967 | Dettre et al. | |
| 4,517,375 A | 5/1985 | Schmidt | |
| 4,525,213 A | 6/1985 | Linn | |
| 4,568,718 A | 2/1986 | Huebner et al. | |
| 4,855,162 A | 8/1989 | Wrasidlo et al. | |
| 5,240,774 A | 8/1993 | Ogawa et al. | |
| 5,256,328 A * | 10/1993 | Cavanagh et al. | 510/191 |
| 5,324,566 A | 6/1994 | Ogawa et al. | |
| 5,411,585 A | 5/1995 | Avery et al. | |
| 5,538,762 A | 7/1996 | Ogawa et al. | |
| 5,599,489 A | 2/1997 | Saiki et al. | |
| 5,741,765 A | 4/1998 | Leach | |
| 5,753,734 A | 5/1998 | Maruyama | |
| 6,020,419 A | 2/2000 | Bock et al. | |

(Continued)

FOREIGN PATENT DOCUMENTS

CA 2302118 9/2000

(Continued)

OTHER PUBLICATIONS

English Translation of WO 96/04123 A1.
Deiss et. al., "Steric Stability of TIO2 Nanoparticles in Aqueous Dispersions", Colloids and Surfaces, A: Physicochemical and Engineering Aspects, 1996, 106, pp. 59-62.

Primary Examiner—Brian Mruk

(57) ABSTRACT

A process and a composition are disclosed for producing surfaces that are self-cleaning by water, and in particular, there is disclosed an aqueous system for forming transparent self-cleaning surfaces. In the process, an aqueous mixture comprising (i) nanoparticles having a particle size of less than 300 nanometers and (ii) a surface modifier selected from the group consisting of water-soluble hydrophobic surface modifiers and water-dispersable hydrophobic surface modifiers capable of forming a continuous film from an aqueous solution is provided. The aqueous mixture is applied to a surface, and a self-cleaning transparent coating is formed on the surface upon water evaporation. In one embodiment, the aqueous mixture is essentially free of organic solvents other than coalescing solvents.

14 Claims, 7 Drawing Sheets

U.S. PATENT DOCUMENTS

| | | |
|---|---|---|
| 6,156,409 A | 12/2000 | Doushita et al. |
| 6,197,426 B1 | 3/2001 | Coppens |
| 6,218,000 B1 | 4/2001 | Rudolf et al. |
| 6,323,268 B1 | 11/2001 | Fisher et al. |
| 6,352,582 B1 | 3/2002 | Brown |
| 2002/0048679 A1 | 4/2002 | Lohmer et al. |
| 2002/0084553 A1 | 7/2002 | Nun et al. |
| 2002/0142150 A1 | 10/2002 | Baumari et al. ............ 428/328 |
| 2002/0150723 A1 | 10/2002 | Oles et al. |
| 2002/0150724 A1 | 10/2002 | Nun et al. |
| 2002/0150725 A1 | 10/2002 | Nun et al. |
| 2002/0150726 A1 | 10/2002 | Nun et al. |
| 2002/0164443 A1 | 11/2002 | Oles et al. |
| 2003/0013795 A1 | 1/2003 | Nun et al. |
| 2003/0108716 A1 | 6/2003 | Nun et al. |
| 2003/0147932 A1 | 8/2003 | Nun et al. |

FOREIGN PATENT DOCUMENTS

| | | |
|---|---|---|
| CH | 268258 | 5/1950 |
| EP | 0772514 B1 | 12/1998 |
| EP | 0933388 A2 | 8/1999 |
| EP | 0937962 A2 | 8/1999 |
| EP | 1018531 A2 | 5/2002 |
| EP | 1040874 A2 | 10/2002 |
| GB | 2121059 A | 12/1983 |
| JP | 62191447 | 8/1987 |
| WO | WO 9604123 A1 | 2/1996 |
| WO | WO 01/96511 * | 12/2001 |
| WO | WO01/96511 A2 | 12/2001 |

* cited by examiner

Dipping Solution Concentration

Dipping Solution Concentration

Water Contact Angles for treatment of Glass with Titania-doped Zonyl 8740

Water Contact Angles for treatment of Glass with Titania-doped Zonyl 9373 a)

b)

a)

b)

a)

b)

US 7,196,043 B2

PROCESS AND COMPOSITION FOR PRODUCING SELF-CLEANING SURFACES FROM AQUEOUS SYSTEMS

CROSS-REFERENCES TO RELATED APPLICATIONS

This application claims the benefit of U.S. Provisional Patent Application No. 60/420,711 filed Oct. 23, 2002, which is incorporated herein by reference.

STATEMENT REGARDING FEDERALLY SPONSORED RESEARCH

Not Applicable.

BACKGROUND OF THE INVENTION

1. Field of the Invention

This invention relates to a process and a composition for producing surfaces that are self-cleaning by water. In particular, the invention relates to an aqueous composition for forming self-cleaning surfaces.

2. Description of the Related Art

It is reported in U.S. Patent Application Publication No. 2002/0048679 (and related European Patent Application No. EP 1018531) that surfaces from which water runs off easily have to be either very hydrophilic or hydrophobic. Hydrophilic surfaces have low contact angles with water, and this brings about rapid distribution of the water on the surface and finally rapid run-off of the resultant film of water from the surface. In contrast, hydrophobic surfaces form droplets through large contact angles with water. These droplets can roll off rapidly from inclined surfaces.

U.S. 2002/0048679 also notes that articles with surfaces which are (or have been made) difficult to wet have a number of commercially important features. For example, these surfaces are easy to clean, and deposits find it difficult to adhere to these surfaces. Thus, there have been numerous efforts to create surfaces which are difficult to wet in order to provide dirt-repellent surfaces and/or surfaces that can be self-cleaned by rain or moving water. U.S. 2002/0048679 cites surfaces having a smooth extremely hydrophobic polymer (e.g., polytetrafluoroethylene) film and surfaces having a smooth extremely hydrophilic polymer film as examples of surfaces on which water and dirt can run off without forming droplets. U.S. 2002/0048679 teaches that a long-term hydrophobic coating can be formed by applying certain silane derivatives underneath a hydrophobic coating on a surface. Other self-cleaning surfaces are described in U.S. Patent Application Publication Nos. US 2002/0150723, US 2002/0150724, US 2002/0150725, US 2002/0150726, US 2003/0013795 and US 2003/0147932.

UK Patent Application GB 2121059 describes the problems associated with the staining of the glass used in greenhouses. In particular, stained glass causes a loss in light transmission that results in a loss of yield in a crop such as tomatoes. This reference teaches that coating compositions formed from a hydrophilic monomer (e.g., hydroxyalkyl acrylate) and a hydrophobic monomer (e.g., an alkyl acrylate) can form a self-cleaning coating on a glass surface. The coatings are said to be self-cleaning (e.g., by rain) yet sufficiently water-resistant to be durable on outdoor exposure.

U.S. Pat. No. 5,324,566 describes the use of hydrophobic fluorinated siloxane polymers for producing water repellent surfaces. It is disclosed in this patent that the water repelling properties of the fluorinated siloxane polymer surface film can be improved by forming surface irregularities in the surface and/or the surface film. In one form, the surface is provided with irregularities of a height from about 0.1 micrometers up to the wavelength of visible light. See, also, U.S. Pat. No. 5,599,489.

U.S. Pat. No. 6,156,409 describes the use of surface irregularities in a film coating to create hydrophilic surfaces having low contact angles with water and having improved water run-off. In one embodiment, the film is formed so as to have an arithmetic mean roughness (Ra) from 1.5 to 80 nanometers and a mean interval (Sm) of dents and projections from 4 to 300 nanometers by using metal oxide fine particles in a coating solution. It is noted that if the mean interval (Sm) value exceeds 300 nanometers, the transparency of the coating may be spoiled.

U.S. Pat. No. 3,354,022 also discloses methods for preparing water repellent surfaces wherein surface projections or surface depressions are formed in a surface. CH-PS 26 82 58 describes water repellent surfaces which have a contact angle of over 120 degrees with water. The surfaces are obtained by application of powders such as Kaolin, talc, clay or silica gel onto a substrate, where the powder is first made hydrophobic by means of organic silicon compounds. The application takes place together with hardenable resins or from solutions in organic solvents.

WO 96/04123 and related European Patent No. EP 772514 B1 describe other processes for lowering the wettability of articles via topological changes to the article surfaces. The applicant in WO 96/04123 reported that after many years of experimentation, it was determined that surfaces of certain plants are capable of being cleaned by rain or moving water and that no solid dirt particles can be permanently deposited on such surfaces. By way of various studies, the applicant in WO 96/04123 determined that the ability for self-cleaning of a plant surface is very dependent on the surface structure of the plant. The applicant disclosed that it is technically possible to make the surfaces of articles artificially self-cleaning, merely by providing them artificially with a surface structure of elevations and depressions, where care is taken such that the distance between the elevations of the surface structure in a range of 5 to 200 micrometers, the height of the elevations is in the range of 5 to 100 micrometers, and the elevations consist of hydrophobic materials. The described self-cleaning surfaces can be produced either by creating the surface structures from hydrophobic polymers right during the manufacture, or creating the surface structures subsequently, and specifically either by subsequent imprinting or etching or by adhesion of a polymer made of the hydrophobic polymers. Often, the self-cleaning surfaces described in WO 96/04123 are termed "Lotus-effect" surfaces or coatings, and the technology is termed "Lotus-Effect" technology.

European Patent Application No. EP 933388 describes articles having surfaces with liquid-repellent regions having projections having a mean height of 50 nanometers to 10 micrometers and a mean spacing of 50 nanometers to 10 micrometers. European Patent Application No. EP 1040874 (also Canadian Patent Application 2,302,118) describes articles having surfaces which have regions that are liquid-repellent and regions that are liquid-wetting in a defined location. The liquid-repellent regions have protuberances having a mean height of 50 nanometers to 10 micrometers and a mean spacing of 50 nanometers to 10 micrometers. European Patent Application No. EP 937962 describes methods for examining these types of surfaces.

While the above documents teach various methods for creating self-cleaning surfaces (or "Lotus-Effect" surfaces) that combine surface roughness and/or hydrophobicity to provide self-cleaning benefits, the reported methods and materials do have drawbacks. Specifically, the reported "Lotus-Effect" technology suffers from several key limitations including incompatibility with aqueous formulations, and the formation of coatings that are opaque white and exceedingly fragile. Thus, there is a need for a process and an aqueous system for producing surfaces that are self-cleaning by water and transparent.

SUMMARY OF THE INVENTION

The foregoing needs are met by a process according to the invention for producing a self-cleaning coating on a surface. In the process, an aqueous mixture comprising (i) nanoparticles having a particle size of less than 300 nanometers and (ii) a surface modifier selected from the group consisting of water-soluble hydrophobic surface modifiers and water-dispersable hydrophobic surface modifiers capable of forming a continuous film from an aqueous solution is provided. Preferably, the aqueous mixture is essentially free of organic solvents other than coalescing solvents. The aqueous mixture is applied to a surface, and a self-cleaning transparent coating is formed on the surface upon water evaporation. The "self-cleaning coating" is a coating which may be cleaned by the application of moving water.

Preferably the nanoparticles have a particle size of less than 200 nanometers, and most preferably, the nanoparticles have a particle size of less than 100 nanometers. In one form, the nanoparticles are selected from the group consisting of metallic oxides. Examples include silicon dioxide, aluminum oxide, zirconium oxide, titanium dioxide, cerium oxide, zinc oxide, and mixtures thereof. In another form, the nanoparticles are selected from solid fluoropolymers.

Typically, the aqueous mixture is a stable dispersion of the nanoparticles over the pH range of 7–11. Optionally, the aqueous mixture further comprises a dispersing agent such that the aqueous mixture is a stable dispersion of the nanoparticles over the pH range of 4–11.

The process produces a self-cleaning coating that includes surface protrusions and has a surface roughness of 100 nanometers or less, the surface roughness being defined as a number which equals the mean deviation of the surface protrusions from a hypothetical perfect flat surface. Preferably, the self-cleaning coating includes surface protrusions with the maximum protrusion being 200 nanometers high.

The aqueous mixture and method are suitable for forming a self-cleaning coating on hard surfaces such as glass, tile, wash bowls, toilets, shower walls, bathtubs, walls, floors, windows, painted and washable wall papered surfaces, etc. The aqueous mixture and method are also suitable for forming a self-cleaning coating on soft surfaces such as fabric, textiles, fibers, woven materials, non-woven materials, and carpets. The method can render such hard and soft surfaces stain resistant.

It is therefore an advantage of the present invention to provide a process and a composition for producing surfaces that are self-cleaning by water wherein the composition is a stable aqueous-based system.

It is another advantage of the present invention to provide a process and a composition for producing surfaces that are self-cleaning by water wherein a consumer may apply a temporary coating with identifiable cleaning benefit ("easier-to-clean", "cleaner-longer", etc.) to a surface.

It is yet another advantage of the present invention to provide a process and a composition for producing surfaces that are self-cleaning by water wherein a transparent coating without significant loss of gloss is formed by the process and composition.

These and other features, aspects, and advantages of the present invention will become better understood upon consideration of the following detailed description, drawings, and appended claims.

DETAILED DESCRIPTION OF THE INVENTION

Figure 1:
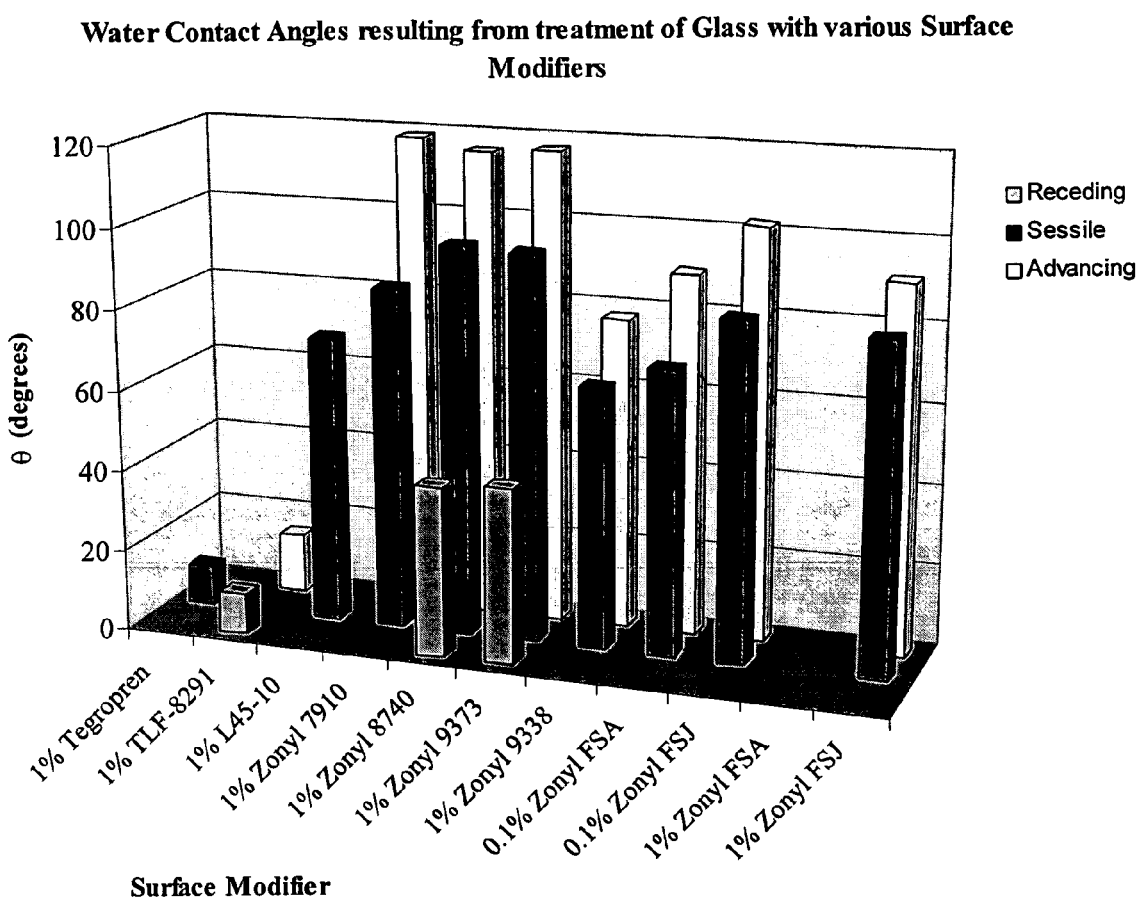
FIG. 1 shows advancing, sessile and receding contact angles in degrees for glass slides treated with various fluoropolymers, fluorosurfactants and silicones.

The present invention is directed to a process and a composition for producing surfaces that are self-cleaning by water. In particular, the invention relates to an aqueous system for forming transparent self-cleaning surfaces. In the process, an aqueous mixture comprising (i) nanoparticles having a particle size of less than 300 nanometers and (ii) a surface modifier selected from the group consisting of water-soluble hydrophobic surface modifiers and water-dispersable hydrophobic surface modifiers capable of forming a continuous film from an aqueous solution is provided. The aqueous mixture is applied to a surface, and a self-cleaning transparent coating is formed on the surface upon water evaporation.

The surface modifier may be any composition that can be applied to a surface in an aqueous system and that settles on the nanoparticles and forms a film when water in the mixture evaporates from the treated surface. In one embodiment, the surface modifier is a water-dispersable hydrophobic surface modifier capable of forming a continuous film from an aqueous solution. In another embodiment, the surface modifier is a water-soluble hydrophobic surface modifier. Non-limiting examples of surface modifiers include: (1) cationic polydimethylsiloxanes having at least one nitrogen-containing end group; (2) alkoxysilanes having the formula $R_aSi$ $(OR^1)_{4-a}$ where a is 1 or 2, R is $C_{1-10}$ alkyl, and $R^1$ is $C_{1-10}$ substituted or unsubstituted alkyl; (3) polydimethylsiloxanes crosslinked with an alkoxysilane having the formula $R_aSi(OR^2)_{4-a}$ where a is 1 or 2, R is $C_{1-10}$ alkyl, and $R^2$ is $C_{1-10}$ alkyl; (4) fluorourethanes with polyalkylene oxide units; (5) fluorinated acrylic polymers and copolymers; (6) perfluoroalkyl methacrylic polymers and copolymers; (7) fluorosurfactants; and (8) silicone modified polyacrylates.

Specific examples of cationic polydimethylsiloxanes having at least one nitrogen-containing end group include the cationic polydimethylsiloxanes described in U.S. Pat. No. 5,741,765. Preferred cationic polydimethylsiloxanes include those commercially available as Tegopren™ 6920, 6922, 6924, 6950 from Goldschmidt.

A specific example of an alkoxysilane having the formula $R_aSi(OR^1)_{4-a}$ where a is 1 or 2, R is $C_{1-10}$ alkyl, and $R^1$ is $C_{1-10}$ substituted or unsubstituted alkyl is TLF-8291, an alkyltrialkoxysilane available from DuPont.

A specific example of a polydimethylsiloxane crosslinked with an alkoxysilane having the formula $R_aSi(OR^2)_{4-a}$ where a is 1 or 2, R is $C_{1-10}$ alkyl, and $R^2$ is $C_{1-10}$ alkyl can be prepared by crosslinking polydimethylsiloxane silicone oil (such as L-45-10 available from OSI Specialties) with methyltrimethoxysilane (such as Sil-Quest A-1630 available from OSI Specialties) in the presence of acetic acid in a ratio of 11:1:0.5.

A specific example of a fluorourethane with polyalkylene oxide units is Zonyl® 7910, a fluorourethane with polyethylene oxide units, available from DuPont.

Specific examples of fluorinated acrylic polymers and copolymers include Zonyl® 9373 and anionic Zonyl® 9338 available from DuPont.

A specific example of a perfluoroalkyl methacrylic copolymer is a cationic copolymer Zonyl® 8740 available from DuPont.

Specific examples of fluorosurfactants include Zonyl® FSA and FSJ available from DuPont. These fluorosurfactants include a hydrophobic $C_nF_{2n+1}$ tail.

A specific example of a silicone modified polyacrylate is a methoxy propanol acetate solution of a OH-functional silicone modified polyacrylate available from BYK-Chemie under the designation Silclean 3700.

The surface modifier is typically present in the aqueous mixture at 0.001 to 10 weight percent based on the total weight of the mixture. Preferably, the surface modifier is present in the aqueous mixture at 0.001 to 5 weight percent based on the total weight of the mixture. Most preferably, the surface modifier is present in the aqueous mixture at 0.001 to 2.0 weight percent based on the total weight of the mixture.

The nanoparticles present in the aqueous mixture have a particle size of less than 300 nanometers. Preferably, the nanoparticles present in the aqueous mixture have a particle size of less than 200 nanometers. Most preferably, the nanoparticles present in the aqueous mixture have a particle size of less than 100 nanometers. The nanoparticles present in the aqueous mixture may have a mean particle size of 100 nanometers or less. Preferably, the nanoparticles have a mean particle size of 4 to 80 nanometers. Most preferably, the nanoparticles have a mean particle size of 20 to 60 nanometers.

The nanoparticles may be selected from metallic oxides and fluoropolymers. Metallic oxide nanoparticles may be selected from the group consisting of silicon dioxide, aluminum oxide, zirconium oxide, titanium dioxide, cerium oxide, zinc oxide, and mixtures thereof. Example fluoropolymer nanoparticles include polytetrafluoroethylene powders.

The nanoparticles are typically present in the aqueous mixture at 0.001 to 10 weight percent based on the total weight of the mixture. Preferably, the nanoparticles are present in the aqueous mixture at 0.001 to 5 weight percent based on the total weight of the mixture. Most preferably, nanoparticles are present in the aqueous mixture at 0.001 to 2.0 weight percent based on the total weight of the mixture.

One of the limitations of nanoparticles in water is that particles quickly agglomerate into large particles. One can either apply the mixtures before agglomeration occurs, or find ways to stabilize them. Nanoparticles in solution can be stabilized through electrostatic or steric interactions and a combination of these approaches can be used to stabilize the smallest particles. Electrostatic stabilization relies on repulsive charge interactions to keep particles apart. The potential drop between the particle surface and bulk solution is a measurable quantity, reported as the zeta potential, and can be affected by changing the solution pH. The zeta potential reflects the effective charge on the particles and thus the electrostatic repulsion between them. These interactions can stabilize nanoparticles at potentials sufficiently positive or negative of the isoelectric point (zeta potential=0) in low conductivity solutions.

Preferably, the aqueous mixture is a colloidal dispersion. The aqueous system including nanoparticles is a stable dispersion between pH 7 and 11. In order to widen the pH stability, the aqueous mixture may further comprise a dispersing agent. The dispersing agent may be present in the aqueous mixture at 0.5 to 10 weight percent based on the weight of nanoparticles in the aqueous mixture. When a dispersing agent is present, the aqueous system including nanoparticles is a stable dispersion between pH 4 and 11.

While any dispersing agent compatible with the nanoparticles and the surface modifier may be employed in the aqueous mixture, example dispersing agents include phosphated polyesters, acidic polyesters, polyfunctional polymers with anionic/non-ionic character, copolymers with pigment affinic groups, and mixtures thereof. These dispersing agents are commercially available. One preferred class of dispersing agents is sold under the trademark Disperbyk™ by BYK-Chemie USA Inc., Wallingford, Conn., USA. For example, aqueous titania can be stabilized by adding the following: Disperbyk™ 110, a solution of a proprietary phosphated polyester; Disperbyk™ 111, a proprietary phosphated polyester; Disperbyk™ 180, an alkylolammonium salt of an acidic polyester; Disperbyk™ 190, a solution of a proprietary polyfunctional polymer with anionic/non-ionic character; Disperbyk™ 191, a solution of a proprietary copolymer with pigment affinic groups; and Disperbyk™ 192, a solution of a proprietary copolymer with pigment affinic groups.

In one embodiment, the aqueous mixture is essentially free of organic solvents other than coalescing solvents. By "essentially free" of organic solvents other than coalescing solvents, we mean that the mixture may include coalescing solvents but may not include any other organic solvents above the level of incidental impurities. A coalescing solvent is a solvent that assists in the coalescence of dispersed particles. Example coalescing solvents include glycol ethers or other derivatives of alkylene glycols.

Preferably, the surface modifier can produce an unstructured surface having a surface energy below 30 dynes per centimeter. Most preferably, the surface modifier can produce an unstructured surface having a surface energy below 20 dynes per centimeter.

The aqueous mixture including a surface modifier and nanoparticles (and optionally a dispersing agent) may be applied to a surface to form a self-cleaning transparent coating on the surface. Any suitable application method may be used, such as spraying and dipping. The self-cleaning coating is a coating which may be cleaned by the application of moving water.

Preferably, the coating is a transparent coating without significant loss of gloss. Transparency of the coatings may be achieved by controlling the surface roughness of the coating. The surface roughness is defined as a number which equals the mean deviation of the surface protrusions from a hypothetical perfect surface. In one embodiment, the self-cleaning coating includes surface protrusions such that the coating has a surface roughness of 100 nanometers or less. In another embodiment, the self-cleaning coating includes surface protrusions of 200 nanometers or less. The surface roughness of the coating depends on the particle size of the nanoparticles. The preferred particle sizes for the nanoparticles as described above are selected with a lower size limit such that the surface has effective self-cleaning properties and with an upper limit such that transparency is not lost in the coating.

The process and aqueous mixture may be used to produce a transparent self-cleaning coating on many different types of surfaces. For example, a consumer may apply a temporary transparent self-cleaning coating with identifiable cleaning benefit ("easier-to-clean", "cleaner-longer", etc.) to a surface. Non-limiting examples of surfaces that can be the substrate for a self-cleaning coating formed according to the invention include: hard surfaces such as shower walls, floors, countertops, toilet bowls, windows and mirrors; and soft surfaces such as woven fabric. These surfaces may be rendered stain resistant.

EXAMPLES

The following non-limiting examples serve to illustrate the invention.

The materials and methods used in the Examples were as follows:

A. Surface Modifiers:
  1. Fluoropolymers: Zonyl® 9373, 8740, 9338, 7910 available from Dupont.
  2. Fluorosurfactants: Zonyl® FSA, FSJ all available from Dupont.
  3. Silicones: (a) Silclean 3700, a methoxy propanol acetate solution of a OH-functional silicone modified polyacrylate available from BYK Chemie; (b) L45-10 polydimethylsiloxane (PDMS) silicone oil crosslinked with Sil-Quest A-1630 methyltrimethoxysilane both available from OSI Specialties; and (c) Tegopren® 6920, 6922, 6924, 6950 all available from Goldschmidt.
  4. Other: TLF-8291 (Alkyltrialkoxysilane) available from Dupont.

B. Nanoparticles:
  1. Titanium Dioxide: (a) NanoTek $TiO_2$ available from Nanophase Technologies Corp, Burr Ridge, Ill. USA; and (b) $TiO_2$ from TAL Materials.
  2. Aluminum Oxide: (a) Dispal 23N4-20 (Boehmite) available from Sasol; and (b) NanoTek $Al_2O_3$.
  3. Fluoropolymer: Cefral Coat WS-250 available from Central Glass Co.
  4. Silicon Dioxide: (a) Ludox Colloidal Silica available from Dupont, and (b) HDK H15, H2000 (hydrophobic) available from Wacker.
  5. Zinc Oxide: Nanox 200 available from Rheox.

Surface topography measurements were made using Atomic Force Microscopy.

Example 1

Creation of Nanoscale Surface Roughness Using Titania Particles

To demonstrate that aqueous mixtures of $TiO_2$ can create nanoscale surface roughness, an aqueous mixture of 0.01% $TiO_2$ (titania having a mean particle size of 25–51 nanometers available as NanoTek $TiO_2$ from Nanophase Technologies Corp.) was applied to a glass slide and Atomic Force Microscopy images of the nanosized $TiO_2$ on glass were taken.

In particular, depth profile images were taken in which the light areas were high and the dark areas were low. The contrast scale going from dark to light spanned 108 nanometers which is appropriate for the size scale of the small particles observed. The largest features were thought to be particle agglomerates or may represent the large end of the particle size distribution. The height of these features was saturated on this scale. Phase images were also taken showing the angle difference between the driving frequency and response. The image indicated curved edges created by the nanosized $TiO_2$ particles.

Atomic Force Microscope images of a single protrusion created from an aqueous mixture of $TiO_2$ (having a mean particle size of 25–51 nanometers) and a hydrophobic polymer were taken. Based on the Atomic Force Microscope images, it was determined that in order to arrive at the desired surfaces, $TiO_2$ particles must be close together, but not so close that micron size surface roughness is created. When deep protrusions are created, surfaces lose gloss.

Example 2

Physical Characterization of Surface Films Using Contact Angle Measurements

Tests were performed to characterize various surface films using contact angle measurements.

Example 2a

Tests were performed to screen treatments for hydrophobic surface modification from aqueous-based formulations of various fluoropolymers, fluorosurfactants and silicones. Films were dip-coated onto glass slides and allowed to air-dry overnight prior to contact angle measurement for water droplets. The surface modifiers tested are listed below in Table A. The results are shown in FIG. 1 for the surface modifiers listed in Table A.

TABLE A

| Surface Modifier | Description |
| --- | --- |
| Tegopren ® | Nitrogen Siloxanes from Goldschmidt 6920, 6922, 6924, 6950 |
| TLF-8291 | Alkyltrialkoxysilane from Dupont. |
| L45-10 | PDMS (L45-10): Methyltrimethoxysilane (Sil-quest A-1630): acetic acid (glacial) at 11:1:0.5. Chemicals from OSI. |

TABLE A-continued

| Surface Modifier | Description |
| --- | --- |
| Zonyl® 7910 | Fluorinated Substituted Urethane from Dupont. |
| Zonyl® 8740 | Cationic Perfluoroalkyl Methacrylic Copolymer from Dupont. |
| Zonyl® 9338 | Anionic Fluorinated Acrylic Copolymer from Dupont. |
| Zonyl® 9373 | Fluorinated Acrylic Copolymer from Dupont. |
| Zonyl® FSA | Anionic fluorosurfactant from Dupont. $F(CF_2CF_2)_xCH_2CH_2SCH_2CH_2CO_2^-Li^+$ where x = 1 to 9 |
| Zonyl® FSJ | Fluorosurfactant blend of $(R_fCH_2CH_2O)_xPO$ $(O^-NH_4^+)_yx + y = 3$ where $R_f = CF_3CF_2(CF_2CF_2)_x$ and x = 2–4, and hydrocarbon surfactants from Dupont. |

Example 2b

Figure 2:
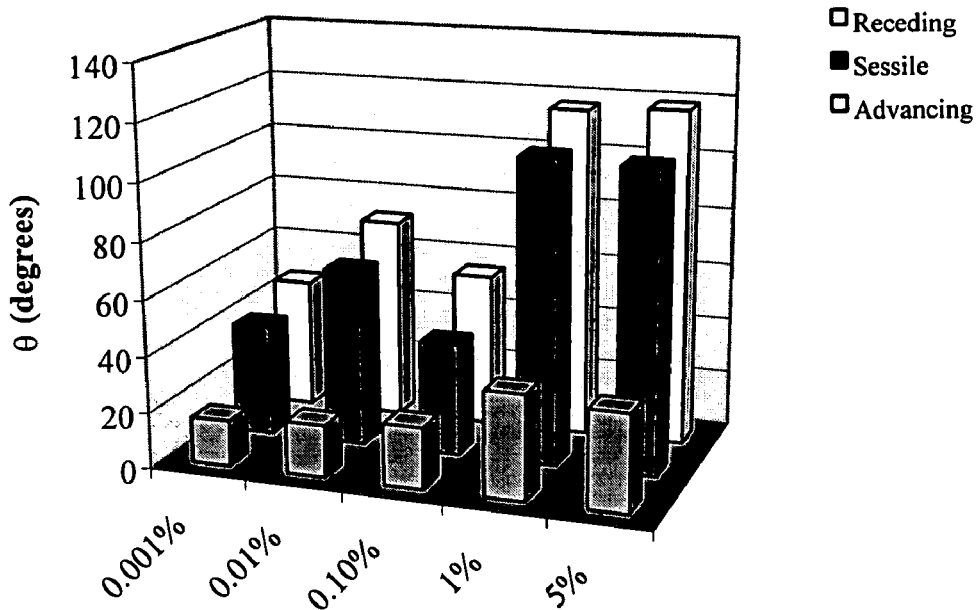
FIG. 2 shows the results for tests for water contact angles on treated glass substrates as a function of fluoropolymer concentration in a dipping solution.
Figure 2:
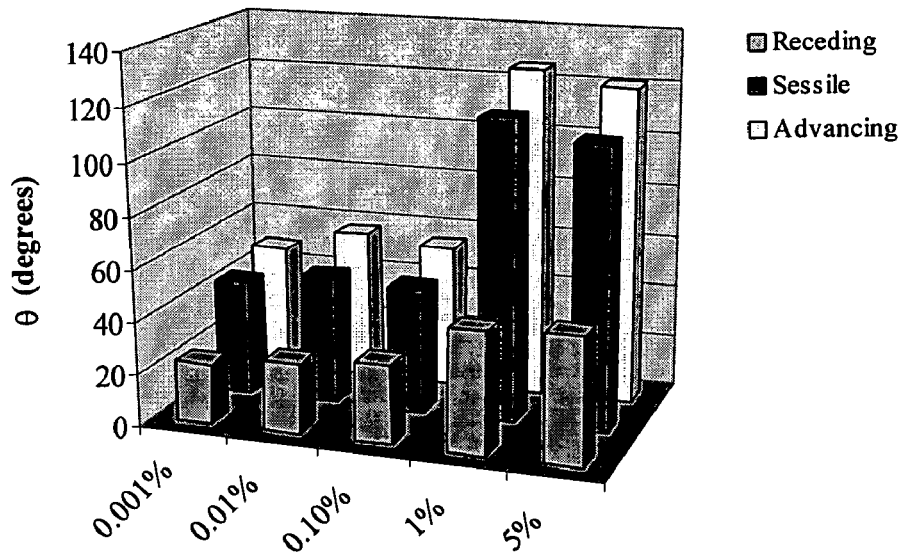

Two of the surface modifiers from Example 2a, Zonyl® 8740 perfluoroalkyl methacrylic copolymer & Zonyl® 9373 fluorinated acrylic copolymer, were tested for water contact angles on treated glass substrates as a function of fluoropolymer concentration in the dipping solution. An aqueous solution of these copolymers was applied to a glass slide and contact angle measurements were taken. FIG. 2 shows the results for water contact angles on treated glass substrates as a function of Zonyl® fluoropolymer concentration in the dipping solution. Each bar represents the average of three measurements at different positions on the slide with three replicate determinations of contact angle per drop. Measurements were made to determine the level of surface modifier providing a uniform hydrophobic coating.

Example 2c

Figure 3:
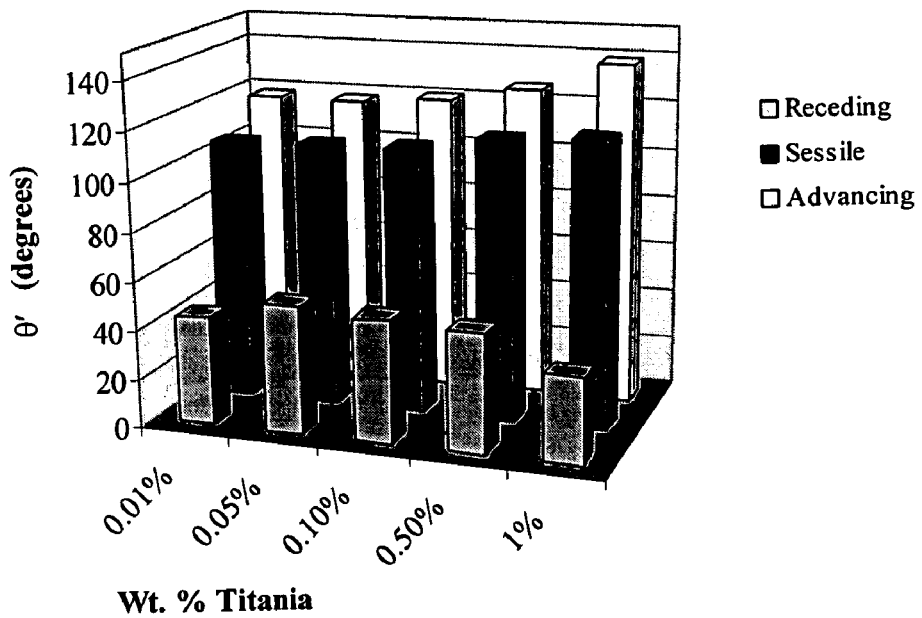
FIG. 3 shows the results of tests for water contact angles on glass substrates for $TiO_2$ doped 1% fluoropolymer surface coatings as a function of weight percent $TiO_2$ in the dipping solution.
Figure 3:
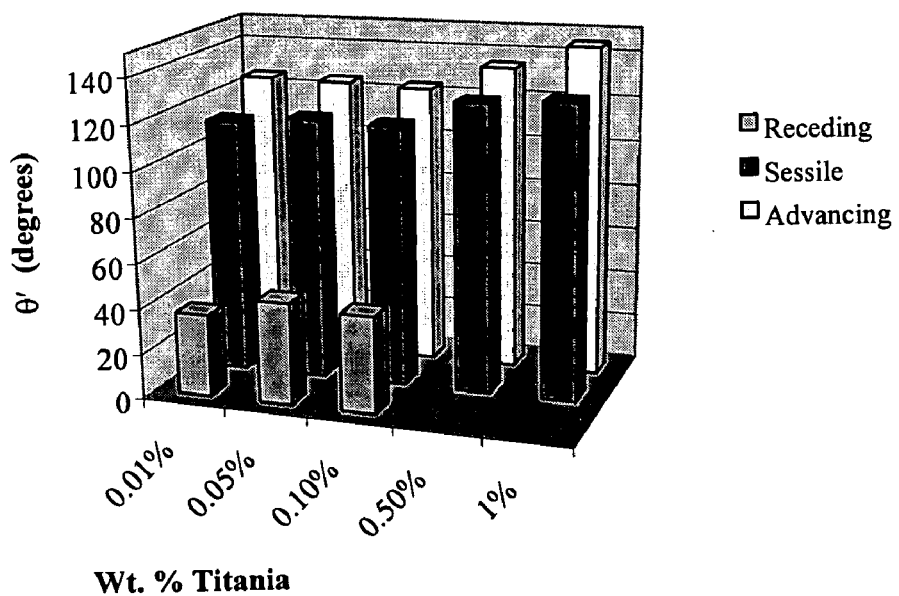

The two surface modifiers from Example 2a, Zonyl® 8740 perfluoroalkyl methacrylic copolymer & Zonyl® 9373 fluorinated acrylic copolymer, were tested for water contact angles on treated glass substrates as a function of titania concentration based on a 1% fluoropolymer dipping solution. The titania had a mean particle size of 25–51 nanometers and is available as NanoTek $TiO_2$ from Nanophase Technologies Corp. Solutions were prepared and applied to a glass slide, and contact angle measurements were taken. FIG. 3 shows the observed water contact angles on glass substrates for $TiO_2$ doped 1% Zonyle fluoropolymer surface coatings as a function of weight percent $TiO_2$ dopant in the dipping solution. Each bar represents the average of three measurements at different positions on the slide with three replicate determinations of contact angle per drop.

Example 2d

Figure 4:
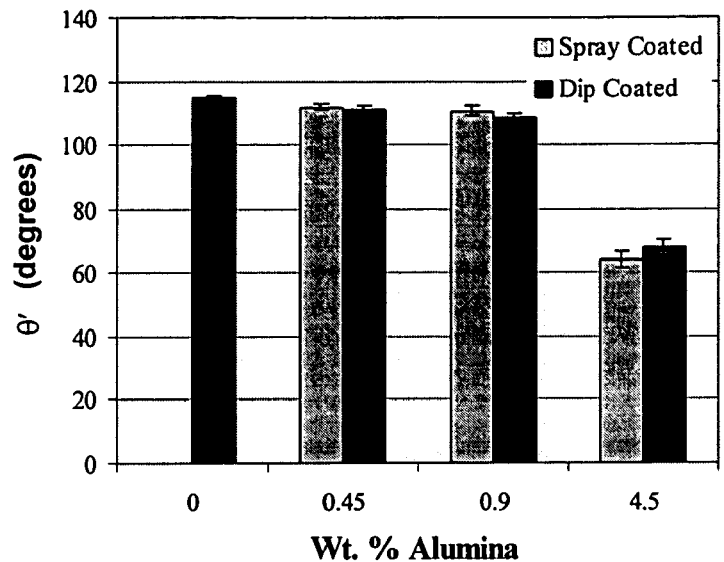
FIG. 4 shows the results of a test for water contact angles on glass substrates for $Al_2O_3$ doped 1% fluoropolymer surface coatings as a function of weight percent $Al_2O_3$ in the dipping solution.

One of the surface modifiers from Example 2a, Zonyl® 9373 fluorinated acrylic copolymer was tested for water contact angles on treated glass substrates as a function of alumina concentration based on a 1% fluoropolymer dipping solution. Solutions were prepared and applied to a glass slide, and contact angle measurements were taken. FIG. 4 shows the observed water contact angles on glass substrates for $Al_2O_3$ doped 1% Zonyl® 9373 surface coatings as a function of weight percent dopant for dip- and spray-coated films. Each bar represents the average of three measurements at different positions on the slide with three replicate determinations of contact angle per drop.

Example 2e

Figure 5:
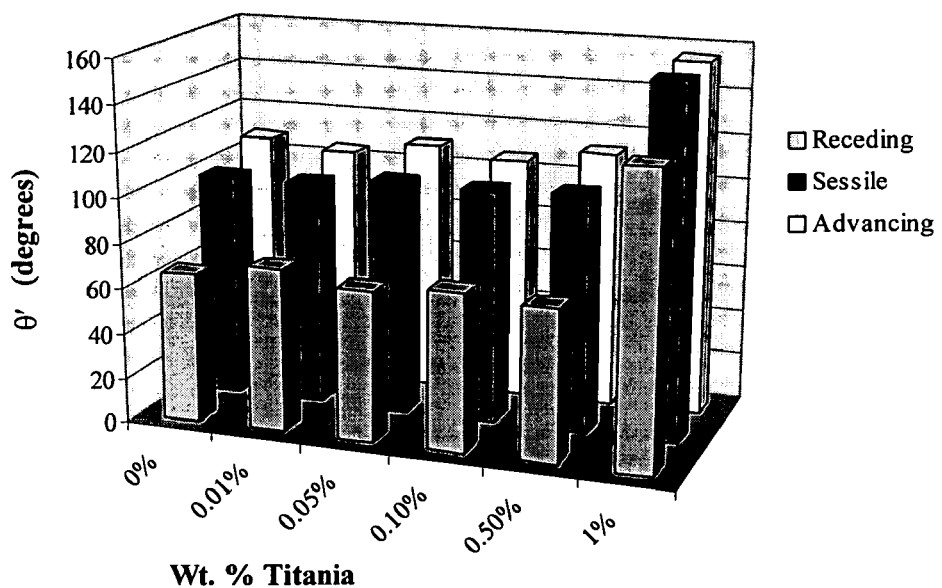
FIG. 5 shows the results of a test for water contact angles on glass substrates for $TiO_2$ doped 5% silicone polymer surface coatings as a function of weight percent $TiO_2$ in the dipping solution.

BYK® Silclean 3700, a methoxy propanol acetate solution of a OH-functional silicone modified polyacrylate, was tested for water contact angles on treated glass substrates as a function of titania concentration based on a 5% polymer dipping solution. Solutions were prepared and applied to a glass slide, and contact angle measurements were taken. FIG. 5 shows the observed water contact angles on glass substrates for $TiO_2$ doped 5% Silclean 3700 as a function of weight percent $TiO_2$ dopant (having a mean particle size of 25–51 nanometers) in the dipping solution. Each bar represents the average of three measurements at different positions on the slide with three replicate determinations of contact angle per drop.

Example 3

Physical Characterization of Films Using Surface Topography Measurements

Figure 6:
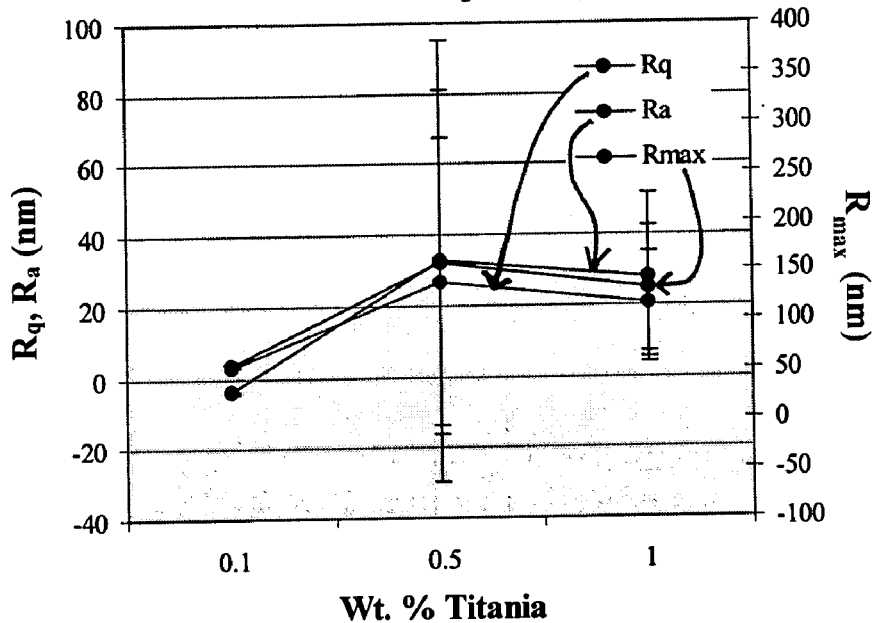
FIG. 6 shows a comparison of nanoscale surface roughness as a function of $TiO_2$ dopant and $Al_2O_3$ dopant levels in 1% fluoropolymer coating on glass.
Figure 6:
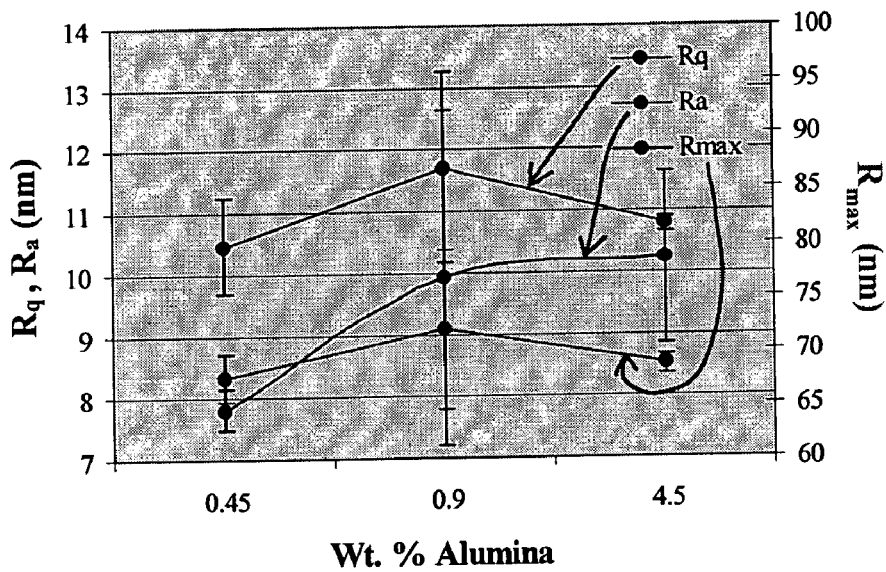

Tests were performed to determine nanoscale surface roughness as a function of dopant level in 1% Zony® 9373 coatings on glass. Aqueous mixtures of titania (having a mean particle size of 25–51 nanometers) doped at 0.1 wt. %, 0.5 wt. % and 1 wt. % and alumina doped at 0.45 wt. %, 0.9 wt. % and 4.5 wt. % in a 1% Zonyl® 9373 solution were applied to a glass slide and AFM images were taken. FIG. 6 shows a comparison of nanoscale surface roughness as a function of dopant level in the 1% Zonyl 9373 coatings on glass. Plot a) summarizes data observed for the $TiO_2$-doped system and the $Al_2O_3$-doped system is shown in plot b). The RMS roughness ($R_q$), average roughness ($R_a$), and the maximum roughness ($R_{max}$), observed at a given sampling area were averaged over 3 sampling areas per coating, and the error bars report the standard deviation of the measurements.

AFM images were taken and confirmed that aqueous mixtures of $TiO_2$ (having a mean particle size of 25–51 nanometers) can create nanoscale surface roughness. In particular, (1) AFM images of glass substrates having $TiO_2$ doped—1% fluoropolymer surface coatings where the weight percent of $TiO_2$ is 0.1%, 0.5% and 1% respectively were taken, (2) AFM images of glass substrates having $Al_2O_3$ doped—1% fluoropolymer surface coatings where the weight percent of $Al_2O_3$ is 0.45%, 0.90% and 4.5% respectively were taken, (3) AFM images of glass substrates having a 5% silicone polymer surface coating were taken, and (4) AFM images of glass substrates having a 1% $TiO_2$ (having a mean particle size of 25–51 nanometers) doped—5% silicone polymer surface coating were taken.

Further AFM images were taken and confirmed that that aqueous mixtures of $TiO_2$ can create nanoscale surface roughness. In particular, AFM images were taken of (1) an aqueous mixture of 5% Silclean 3700, a methoxy propanol acetate solution of a OH-functional silicone modified polyacrylate, and (2) an aqueous mixture of 5% Silclean 3700 and 1 wt. % $TiO_2$ (titania having a mean particle size of 25–51 nanometers) as applied to a glass slide The images indicated the curved edges created by the nanosized $TiO_2$ particles.

Example 4

Physical Characterization of Surface Films Using Transparency Measurements

A set of experiments was run to quantify and compare the transparency of polymer surface coatings having titania and alumina dopants. Transmittance measurements were used to quantify and compare the transparency of surface coatings. Surface films of aqueous mixtures of titania (having a mean particle size of 25–51 nanometers) doped at 0 wt. %, 0.05 wt. %, 0.1 wt. %, 0.5 wt. % and 1 wt. % and alumina doped at 0 wt. %, 0.45 wt. %, 0.9 wt. % and 4.5 wt. % in 1% Zonyl® 9373 were prepared. Transmittance measurements were then taken.

Figure 7:
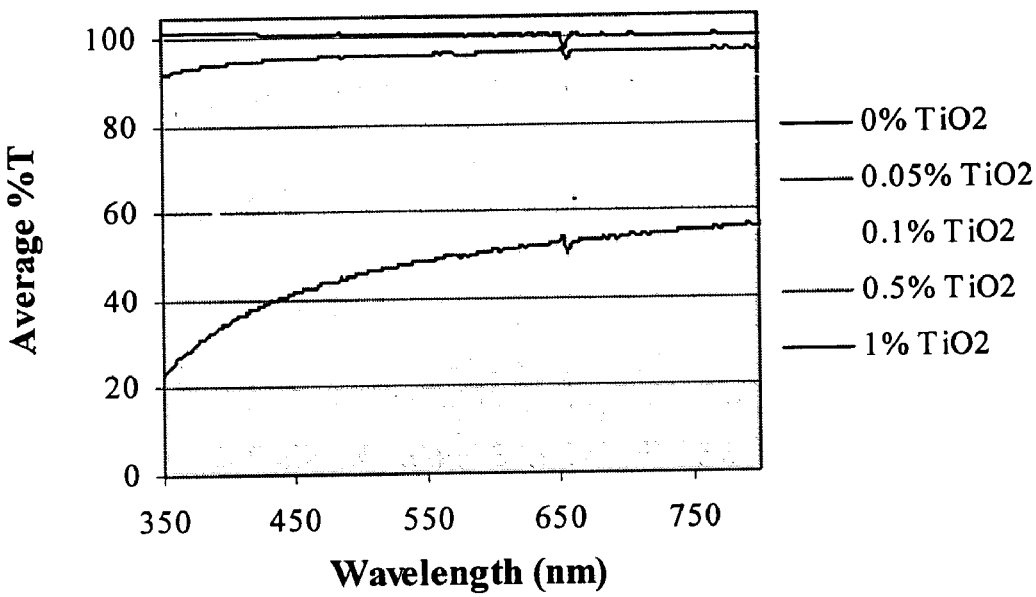
FIG. 7 shows percent transmittance measurements comparing the transparency of surface coatings prepared from $TiO_2$ doped—1% fluoropolymer surface coatings and $Al_2O_3$ doped—1% fluoropolymer surface coatings.
Figure 7:
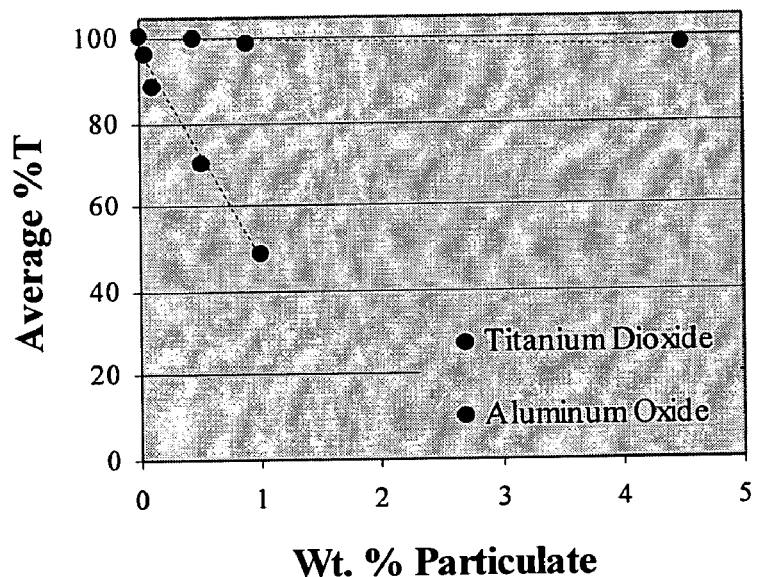

FIG. 7 shows the percent transmittance measurements used to quantify and compare the transparency of surface coatings. In (a), the average % Transmittance is plotted as a function of incident light wavelength and weight percent of $TiO_2$ dopant; each curve represents the average of 3 measurements made at various locations on the film and the lowermost to uppermost lines on the graph correspond respectively to the lowermost to uppermost labels in the right hand legend. The plot in (b) compares the trend in % Transmittance observed as function of weight percent dopant for titanium dioxide and alumina doped coatings with the aluminum oxide corresponding to the uppermost line in the graph.

Example 5

Stability of Nanoparticles in Water

One of the limitations of nanoparticles in water is that particles quickly agglomerate into large particles. One can either apply the mixtures before agglomeration occurs, or find ways to stabilize them. Nanoparticles in solution can be stabilized through electrostatic or steric interactions and a combination of these approaches may be required to stabilize the smallest particles. Electrostatic stabilization relies on repulsive charge interactions to keep particles apart. The potential drop between the particle surface and bulk solution is a measurable quantity, reported as the zeta potential, and can be affected by changing the solution pH. The zeta potential reflects the effective charge on the particles and thus the electrostatic repulsion between them. These interactions can stabilize nanoparticles at potentials sufficiently positive or negative of the isoelectric point (zeta potential=0) in low conductivity solutions. The measurement of zeta potential can define the scope of stable aqueous nanoparticle dispersions.

Figure 8:
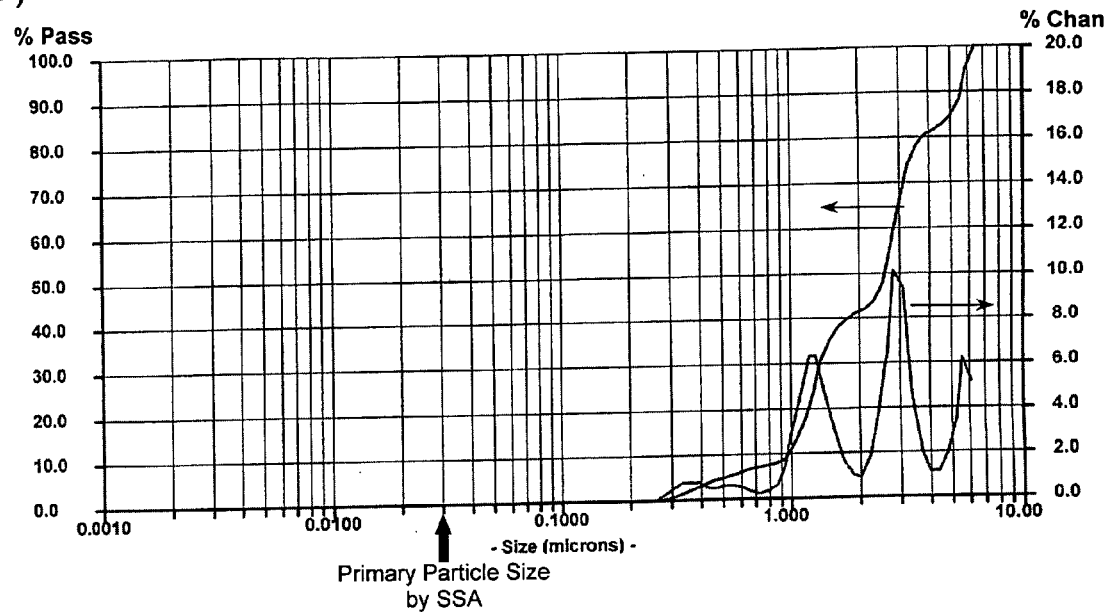
FIG. 8 shows a comparison of the particle size distribution of aqueous $TiO_2$ at (a) pH=6 and (b) pH=10.
Figure 8:
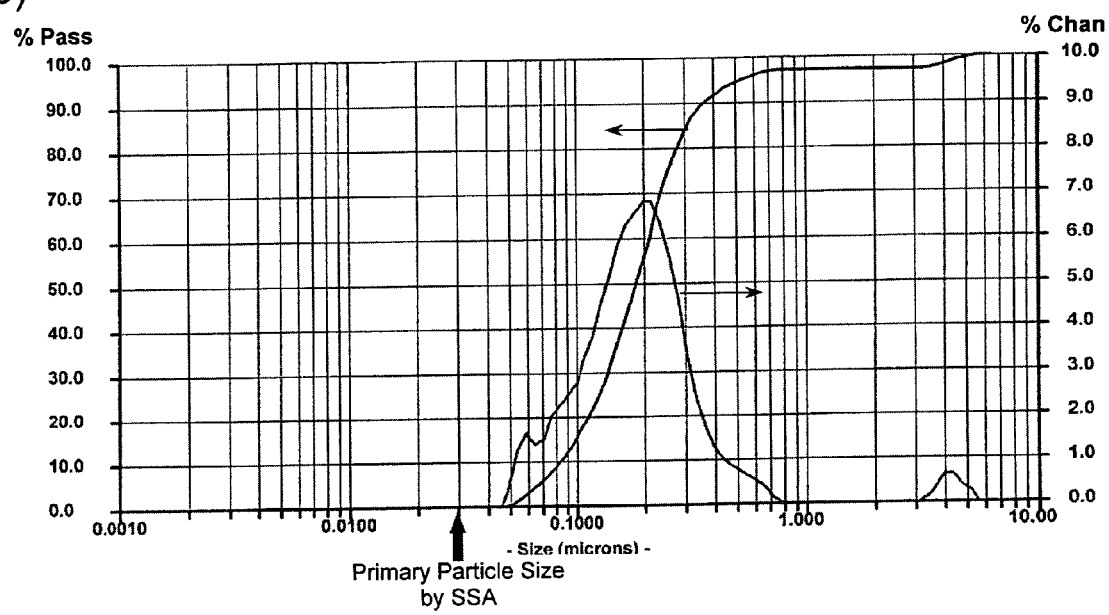

Experiments were performed on aqueous $TiO_2$ (having a mean particle size of 25–51 nanometers). With no other additives present, we observe stable dispersions between pH 7 and 10 with a maximum stability at 10. For example, a particle size analysis of 0.01% aqueous $TiO_2$ at pH 6 is shown in FIG. 8a. (Since this analysis was performed in solution using light scattering, particle size is calculated from hydrodynamic volume. Therefore, these numbers are larger than dry powders measured by SSA adsorption. The point is not which method furnishes more accurate numbers, but to demonstrate that particles agglomerate in water.) Note that the originally supplied 25–51 nanometer (measured by SSA gas adsorption) titania material has agglomerated to over 1 micron. FIG. 8b shows the particle size distribution for $TiO_2$ (having a mean particle size of 25–51 nanometers) at pH 10. In this case, particle size remains unchanged. FIGS. 8a and 8b refer to the volume rather than the number distribution and are therefore strongly influenced by coarse particles. The horizontal arrows indicate the appropriate axis for each of the two curves shown. The curve plotted against the left hand axis indicates the cumulative volume distribution while the curve plotted against the right hand axis is the relative volume distribution. The primary particle size as measured by a Specific Surface Area (gas adsorption) experiment is 29 nanometers and is shown with a vertical upward arrow.

Steric stabilization of nanoparticles can be accomplished by adsorption of polymers onto the particle surface. For example, in "Steric Stability of $TiO_2$ Nanoparticles in Aqueous Dispersions" in *Colloids and Surfaces A: Physicochemical and Engineering Aspects*, 1996, 106, pages 59–62, Deiss et al. report on the use of this strategy to stabilize aqueous $TiO_2$ dispersions. In this approach, polymer adsorption on the particle surface induces repulsive steric forces between particles that prevent aggregation. This approach can extend the stability regime near the potential of zero charge where electrostatic stabilization of particles is minimized and is advantageous in high conductivity solutions where the extent electrical double layer is very short. The addition of polymers changes the range of stability. For example, the addition of a polymer to a 0.01% dispersion of $TiO_2$ widens the range to between 4 and 10. Within this range, a preferred pH can be determined.

Commercially available dispersing agents can also stabilize nanoparticle suspensions. For example, aqueous $TiO_2$ can be stabilized by adding the following (all are commercially available from BYK-Chemie): 1. Disperbyk 180 at 1.5–2.5% based on $TiO_2$; 2. Disperbyk 110 at 2–4% based on $TiO_2$; 3. Disperbyk 111 at 1–3% based on $TiO_2$; 4. Disperbyk 191 at 4–7% based on $TiO_2$; 5. Disperbyk 192 at 4–7% based on $TiO_2$. These dispersants impart stability through a combination of electrostatic and steric stabilization approaches. According to the manufacturer literature, these additives deflocculate pigments through steric stabilization of the pigments. They also provide equal electrical charge to pigments to avoid possible co-flocculation of unequally charged pigments. Optimization of the dispersant level is strongly dependent on the particle size. In the case of Teflon, optimal stabilization is achieved using alcohol ethoxylate surfactants. A summary of Dynamic Light Scattering Measurements for Disperbyk brand dispersants is provided in Table 1 below.

TABLE 1

Summary of Dynamic Light Scattering Measurements.

| Sample | pH | Dispersant | Processing | mV | mN | PD |
|---|---|---|---|---|---|---|
| 1 | 5–6 (unmodified) | | Filtered at 0.1 μm | 2.693 | 0.5038 | 5.3 |
| 2 | 5–6 (unmodified) | | Filtered at 2.5 μm | 2.473 | 0.0845 | 29.3 |
| 3 | 8 | | Filtered at 2.5 μm | 0.2405 | 0.0960 | 2.5 |

TABLE 1-continued

Summary of Dynamic Light Scattering Measurements.

| Sample | pH | Dispersant | Processing | mV | mN | PD |
|---|---|---|---|---|---|---|
| 4 | 10 | | Filtered at 2.5 μm | 0.3073 | 0.0884 | 3.5 |
| 5* | 5–6 (unmodified) | 3% Disperbyk 110 | | 0.9941 | 0.1629 | 6.1 |
| 6* | 5–6 (unmodified) | 2% Disperbyk 111 | | 0.5056 | 0.0838 | 6.0 |
| 7* | 5–6 (unmodified) | 2% Disperbyk 180 | | 2.923 | 0.6902 | 4.2 |
| 8* | 5–6 (unmodified) | 11% Disperbyk 190 | | 2.013 | 0.1960 | 10.3 |
| 9* | 5–6 (unmodified) | 5.5% Disperbyk 191 | | 0.2694 | 0.1069 | 2.5 |
| 10* | 5–6 (unmodified) | 5.5% Disperbyk 192 | | 2.413 | 0.0723 | 33.4 |
| 11* | 5–6 (unmodified) | 30% Disperbyk 110 | Unfiltered; Sonicated | 0.5592 | 0.2436 | 2.3 |
| 12* | 5–6 (unmodified) | 20% Disperbyk 180 | Unfiltered; Sonicated | 0.2686 | 0.1372 | 2.0 |
| 13* | 5–6 (unmodified) | 55% Disperbyk 192 | Unfiltered; Sonicated | 2.917 | 0.1758 | 16.6 |
| 14* | 5–6 (unmodified) | 300% Disperbyk 110 | Unfiltered; Sonicated | 0.9026 | 0.1925 | 4.7 |
| 15* | 5–6 (unmodified) | 200% Disperbyk 111 | Unfiltered; Sonicated | 0.8719 | 0.1584 | 5.5 |
| 16* | 5–6 (unmodified) | 200% Disperbyk 180 | Unfiltered; Sonicated | 0.5553 | 0.1080 | 5.1 |
| 17* | 5–6 (unmodified) | 1100% Disperbyk 190 | Unfiltered; Sonicated | 0.3512 | 0.0995 | 3.5 |
| 18* | 5–6 (unmodified) | 550% Disperbyk 191 | Unfiltered; Sonicated | 0.4029 | 0.1186 | 3.4 |
| 19* | 5–6 (unmodified) | 550% Disperbyk 192 | Unfiltered; Sonicated | 2.241 | 0.0136 | 164.8 | mV = volume average emphasizes large particles
mN = number average emphasizes small particles
PD = mV/mN = polydispersity
% Dispersant relative to % $TiO_2$
All solutions 0.01% $TiO_2$;
Starred samples also contain 25% polymer (relative to $TiO_2$) and 5% Ethanol.

Example 6

Use of the Invention for Imparting Water-Repellency to Porous Surfaces

Experiments were run and confirmed that an aqueous solution of 1 wt. % titania (having a mean particle size of 25–51 nanometers) in 1% Zonyle® 9373 could be applied to a surface to create a surface which is difficult to wet (i.e., water repellent). A 1% $TiO_2$+1% Zonyl® 9373 coating was applied to (a) filter paper (Whatman #1), (b) terrazzo tile, and (c) a cotton-polyester blend (35:65) fabric. The surfaces were allowed to air-dry overnight prior to testing. Water drops were then applied to the coated surfaces. Photos of stable water drops showed the water repellency imparted to porous surfaces by the coating. Spherical water drops were noted on (a) filter paper (Whatman #1), (b) Terrazzo tile, and (c) the Cotton-Polyester blend (35:65). Additional porous surfaces tested include 100% Cotton and the unglazed side of a ceramic tile. In each case, the water drops were stable and in some cases highly mobile on the treated surfaces, while in the absence of the coating, water soaks in on contact.

A control experiment was then performed to compare the coating prepared on a surface using a 1% Zonyl® 9373 solution with and without an added $TiO_2$ nanoparticle dopant (having a mean particle size of 25–51 nanometers). A 1% $TiO_2$+1% Zonyl® 9373 coating was applied to filter paper (Whatman #1), and a 1% Zonyl® 9373 coating (no $TiO_2$) was applied to filter paper (Whatman #1). The samples were allowed to air-dry. The beading of water on filter paper (Whatman #1) with and without an added $TiO_2$ nanoparticle dopant was observed.

Example 7

Use of the Invention for Preparing Self-Cleaning Surfaces

Experiments were run to determine whether an aqueous solution of 1 wt. % titania (having a mean particle size of 25–51 nanometers) in 1% Zonyle® 9373 could be applied to a surface to create a self-cleaning surface. A 1% $TiO_2$+1% Zonyl® 9373 coating was applied to filter paper (Whatman #1), and the paper was allowed to air-dry. A clean water drop was placed on the left side of the coated paper, and black charcoal dust was applied on the right side of the coated paper. A photo was then taken showing the water drop on the left and the black dust on the right. Next the filter paper was momentarily inclined, causing the drop to roll across the surface, and then returned to horizontal. The self-cleaning properties of the surface coating were confirmed by a second photo taken that showed a cleaned path through the applied dust and the water drop as a black sphere on the right.

Example 8

Use of the Invention for Stain-Resistance on Paper

A first series of experiments were run to determine whether an aqueous solution of 1 wt. % titania (having a mean particle size of 25–51 nanometers) in 1% Zonyl® 9373 could be applied to a porous paper surface to create a stain-resistant surface. Experiments were also run to determine whether an aqueous solution of 1 wt. % titania (having a mean particle size of 25–51 nanometers) in 5% Silclean 3700 could be applied to a porous paper surface to create a stain-resistant surface.

A first group of filter paper samples were treated with an aqueous solution of 1 wt. % titania (having a mean particle size of 25–51 nanometers) in 1% Zonyl® 9373, and allowed to air dry. A second group of filter paper samples were treated with an aqueous solution of 1 wt. % titania (having a mean particle size of 25–51 nanometers) in 5% Silclean 3700, and allowed to air dry. A control group of untreated filter paper samples were also used. Staining substances were applied to the treated and the untreated filter paper samples, and a first group of photos were taken. After cleaning the staining substances off of the treated and the untreated filter paper samples, a second group of photos were taken. The staining substances tested were: charcoal dust; ketchup; vegetable oil; transmission fluid; coffee; creamed spinach; used motor oil; and blackberry juice.

Photographs were taken and confirmed that both the aqueous solution of 1 wt. % titania doped 1% Zonyl® 9373 and the aqueous solution of 1 wt. % titania doped 5% Silclean 3700 increased stain resistance of the filter paper for all staining substances tested compared to the control group of untreated filter paper samples.

A second series of experiments were run to compare the stain resistant properties imparted to filter paper by (i) an aqueous solution of 1 wt. % titania doped 1% Zonyl® 9373, and (ii) an aqueous solution of 1% Zonyl® 9373. Photographs were taken and confirmed that titania doped 1% Zonyl® 9373 improved stain resistance.

Example 9

Use of the Invention for Stain-Resistance on 100% Cotton Fabric

Experiments were run to determine whether an aqueous solution of 1 wt. % titania (having a mean particle size of 25–51 nanometers) in 1% Zonyl® 9373 could be applied to 100% cotton fabric to create a stain-resistant surface. Experiments were also run to determine whether an aqueous solution of 1 wt. % titania (having a mean particle size of 25–51 nanometers) in 5% Silclean 3700 could be applied to 100% cotton fabric to create a stain-resistant surface.

A first group of 100% cotton fabric samples were treated with an aqueous solution of 1 wt. % titania (having a mean particle size of 25–51 nanometers) in 1% Zonyl® 9373, and allowed to air dry. A second group of 100% cotton fabric samples were treated with an aqueous solution of 1 wt. % titania (having a mean particle size of 25–51 nanometers) in 5% Silclean 3700, and allowed to air dry. A control group of untreated 100% cotton fabric samples were also used. Staining substances were applied to the treated and the untreated 100% cotton fabric samples, and a first group of photos were taken. After cleaning the staining substances off of the treated and the untreated 100% cotton fabric samples, a second group of photos were taken. The staining substances tested were: ketchup; charcoal dust; vegetable oil; transmission fluid; turmeric in water; grass stain; coffee; mustard; water soluble glue; blackberry juice; used motor oil; creamed spinach; and spaghetti sauce.

Photographs were taken and confirmed that both the aqueous solution of 1 wt. % titania doped 1% Zonyl® 9373 increased stain resistance of the 100% cotton fabric for all staining substances tested compared to the control group of untreated 100% cotton fabric samples.

Example 10

Use of the Invention for Stain-Resistance on 35% Cotton—65% Polyester Fabric

Experiments were run to determine whether an aqueous solution of 1 wt. % titania (having a mean particle size of 25–51 nanometers) in 1% Zonyle® 9373 could be applied to 35% cotton—65% polyester fabric to create a stain-resistant surface. Experiments were also run to determine whether an aqueous solution of 1 wt. % titania (having a mean particle size of 25–51 nanometers) in 5% Silclean 3700 could be applied to 35% cotton—65% polyester fabric to create a stain-resistant surface.

A first group of 35% cotton—65% polyester fabric samples were treated with an aqueous solution of 1 wt. % titania (having a mean particle size of 25–51 nanometers) in 1% Zonyl® 9373, and allowed to air dry. A second group of 35% cotton—65% polyester fabric samples were treated with an aqueous solution of 1 wt. % titania (having a mean particle size of 25–51 nanometers) in 5% Silclean 3700, and allowed to air dry. A control group of untreated 35% cotton—65% polyester fabric samples were also used. Staining substances were applied to the treated and the untreated 35% cotton—65% polyester fabric samples, and a first group of photos were taken. After cleaning the staining substances off of the treated and the untreated 35% cotton—65% polyester fabric samples, a second group of photos were taken. The staining substances tested were: coffee; mustard; water soluble glue; blackberry juice; used motor oil; creamed spinach; and spaghetti sauce.

Photos were taken and confirmed that the aqueous solution of 1 wt. % titania doped 1% Zonyl 9373 increased stain resistance of the 35% cotton—65% polyester fabric for all staining substances tested compared to the control group of untreated 35% cotton—65% polyester fabric samples.

Therefore, it can be seen that the invention provides a process and a composition for producing surfaces that are self-cleaning by water wherein (i) the composition is a stable aqueous-based system, (ii) a consumer may apply a temporary coating with identifiable cleaning benefit ("easier-to-clean", "cleaner-longer", etc.) to a surface, and (iii) a transparent coating without significant loss of gloss is formed by the process and composition.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

INDUSTRIAL APPLICABILITY

This invention relates to a process and composition for creating self-cleaning surfaces that combine surface roughness and/or hydrophobicity to provide self-cleaning benefits. Surfaces created using the process and the composition provide many benefits including water-repellency, self-cleaning properties with water, and stain resistance.

What is claimed is:

1. A composition for producing a self-cleaning coating on a surface, the composition comprising:
    an aqueous mixture comprising (i) water, (ii) metal oxide nanoparticles present at between 0.001 percent to 10 percent by weight of the mixture and having a particle size of less than 300 nanometers and (iii) a fluorinated water-soluble hydrophobic surface modifier of between 0.001 percent and 10 percent by weight of the mixture which is capable of forming a continuous film from an aqueous solution,
    wherein the mixture is suitable for use to create a self-cleaning transparent coating on the surface after the mixture is applied to the surface and the water evaporates, and
    wherein the surface modifier can produce an unstructured surface having a surface energy below 30 dynes per centimeter.

2. The composition of claim 1 wherein:
    the water-soluble hydrophobic surface modifier is selected from the group consisting of fluorosurfactants.

3. The composition of claim 1 wherein:
the nanoparticles have a particle size of less than 200 nanometers.

4. The composition of claim 1 wherein:
the nanoparticles have a particle size of less than 100 nanometers.

5. The composition of claim 1 wherein:
the nanoparticles are selected from the group consisting of silicon dioxide, aluminum oxide, zirconium oxide, titanium dioxide, cerium oxide, zinc oxide, and mixtures thereof.

6. The composition of claim 1 wherein:
the aqueous mixture has a pH of 7–11.

7. The composition of claim 1 wherein:
the aqueous mixture is a colloidal dispersion.

8. The composition of claim 7 wherein:
the aqueous mixture further comprises a dispersing agent.

9. The composition of claim 8 wherein: the dispersing agent is present in the aqueous mixture at 0.5 to 10 weight percent based on the weight of nanoparticles in the aqueous mixture.

10. The composition of claim 8 wherein:
the aqueous mixture has a pH of 4–11.

11. The composition of claim 10 wherein:
the dispersing agent is selected from the group consisting of phosphated polyesters, acidic polyesters, polyfunctional polymers with anionic/non-ionic character, copolymers with pigment affinic groups, and mixtures thereof.

12. The composition of claim 1 wherein:
the surface modifier can produce an unstructured surface having a surface energy below 20 dynes per centimeter.

13. The composition of claim 1 wherein:
the aqueous mixture is essentially free of organic solvents other than coalescing solvents.

14. The composition of claim 1 wherein:
the aqueous mixture further comprises a dispersing agent present in the aqueous mixture at 0.5 to 10 weight percent based on the weight of nanoparticles in the aqueous mixture.

* * * * *